United States Patent [19]

Abe

[11] Patent Number: 5,163,720
[45] Date of Patent: Nov. 17, 1992

[54] PIPE JOINT

[75] Inventor: Minoru Abe, Neyagawa, Japan

[73] Assignee: Kabushiki Kaisha Daikin Seisakusho, Neyagawa, Japan

[21] Appl. No.: 721,542

[22] PCT Filed: Nov. 8, 1990

[86] PCT No.: PCT/JP90/01452
§ 371 Date: Jul. 16, 1991
§ 102(e) Date: Jul. 16, 1991

[87] PCT Pub. No.: WO91/08415
PCT Pub. Date: Jun. 13, 1991

[30] Foreign Application Priority Data

Dec. 4, 1989 [JP] Japan .................. 1-141029[U]

[51] Int. Cl.⁵ .............................................. F16L 39/00
[52] U.S. Cl. ................................... 285/319; 285/921
[58] Field of Search ................................ 285/319, 921

[56] References Cited

U.S. PATENT DOCUMENTS

| 4,135,745 | 1/1979 | Dehar .................. 285/921 X |
| 4,637,640 | 1/1987 | Fournier et al. ........ 285/921 X |
| 4,781,400 | 11/1988 | Cunningham .......... 265/319 X |
| 4,948,176 | 8/1990 | Bartholomew ......... 285/319 X |
| 4,948,180 | 8/1990 | Usui et al. ............ 285/319 |

Primary Examiner—Dave W. Arola
Attorney, Agent, or Firm—Armstrong & Kubovcik

[57] ABSTRACT

A pipe joint has a pipe 11 including an outward facing flange 17, a joint body 10 and a tubular metal fixture 20, and the joint body 10 includes a large opening port 12 and a small opening port 13 concentrically in consecutive order from the end side. The tubular fixture 20 has a stopping portion 22, a springy first claw 21 and a springy second claw 23; and the joint body 10 has a fitting groove 10a in which the first claw 21 fits. Therefore, an assembly work can be simplified, and fingers and jigs can be prevented from being caught in.

1 Claim, 1 Drawing Sheet

PIPE JOINT

DESCRIPTION

1. Technical Field

This invention relates to a pipe joint for use in a hydraulic circuit etc.

2. Background Art

This kind of pipe joint is generally equipped with a pipe which has an outward facing flange in the vicinity of its tip portion, an annular joint body in one-side inner peripheral part of which the pipe tip end portion fits, and a tubular fixture which covers an outer peripheral part of the joint body and couples the pipe to the joint body.

An inward facing flange fronting on the outward facing flange is formed integrally on one end of the tubular fixture, and female threads are cut on an inner peripheral surface of the other end of the fixture. The female threads are screwed onto male threads cut on an outer peripheral surface of the joint body, so that the pipe is coupled to the joint body.

In this structure, however, such a method is employed that a coupling work is accomplished by screwing the female threads of the fixture onto the male threads, so that the structure requires a time and man power for its assembly process and is not suitable for mass production. Further, since the fixture should always be kept fitted onto the pipe, the structure is unfavorable from the standpoint of storage and transportation.

In order to solve the above problem, such a structure is also well known that has an outward facing flange formed in the vicinity of tip end portion of a first pipe, a coupling member joint immovably to a side surface opposite to a tip end of the outward facing flange, sealing member fitted to an outer periphery of the tip end portion of the pipe, a second pipe surrounding an outer periphery of the sealing member so as to compress it, a spacer extending integrally from the second pipe and covering an outer periphery of the first pipe with a radial clearance left between them, and a stopping hole formed on an outer periphery of end of the spacer; the coupling member being provided with a pressing projection which is so formed as to be deformed elastically in radial direction and rests in the stopping hole, and the pressing projection having a fitting groove in which an edge of the stopping hole fits so as to limit an elastic deformation of the pressing projection when the first pipe moves in a direction as leaving from the second pipe. (Japanese Unexamined Utility Model Publication No. 62181788)

In this structure, however, it is required to shift the above coupling member in the radial direction in order to have the pressing projection rest in the stopping hole. Therefore, a finger or a jig is ready to be caught between an end of the spacer and the clamping member during assembly work. Further, since the clamping member is composed of an elastic rubber, it should be made thick in order to let it have a sufficient mechanical strength. Therefore, its weight will increase unpreferably. An object of the invention is to solve the above-mentioned problem.

DISCLOSURE OF THE INVENTION

In order to solve the above-mentioned problem, this invention provides a pipe joint having a pipe which includes an outward facing flange in the vicinity of its tip end portion, a joint body for coupling the pipe, and a tubular metal fixture which has a diameter of inner peripheral part larger than that of the above outward facing flange, the above joint body concentrically including an annular large opening port into which the tubular fixture fits from the end side and a small opening port which is connected to the large opening port and in which the pipe tip end portion fits; characterized by that the tubular fixture has a stopping part which extends from its end toward radial outside to rest against a tip end face of the joint body, a springy first claw which is cut and raised from a peripheral wall to an outer peripheral side in an axial direction so that the claw gets away from an axis line as it comes to a side opposite to the small opening port of the joint body, and a springy second claw which is cut and raised from the peripheral wall to an inner peripheral side in the axial direction so that the claw gets near to the axis line as it comes to the small opening port side and rests against a backside face of the outward facing flange, the joint body being provided at its side wall with a fitting hole in which the first claw fits.

According to the present invention, the first claw is fitted in the hole by fitting the tubular fixture in the large diameter hole so that the tubular fixture is secured to the joint body in the assembly work. Then, the second claw is made rest against the backside face of the outward facing flange from this state, by fitting the pipe tip end portion in the small opening port through the inner peripheral part of the tubular fixture, so that the pipe is connected.

BEST MODE FOR CARRYING OUT THE INVENTION

Figure 1:
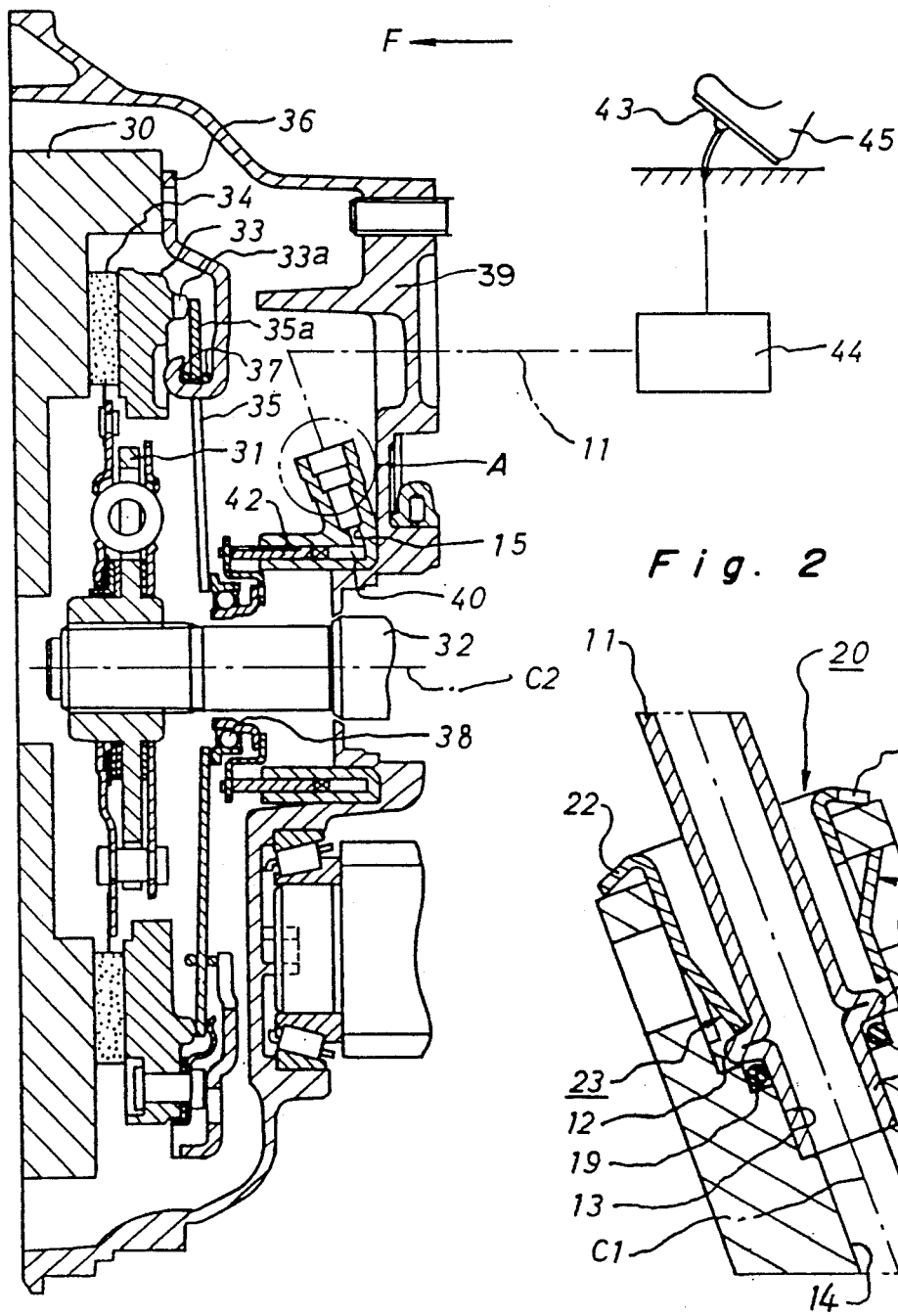
FIG. 1 is a schematic vertical sectional view of a clutch assembly to which a pipe joint of a embodiment is applied
Figure 2:
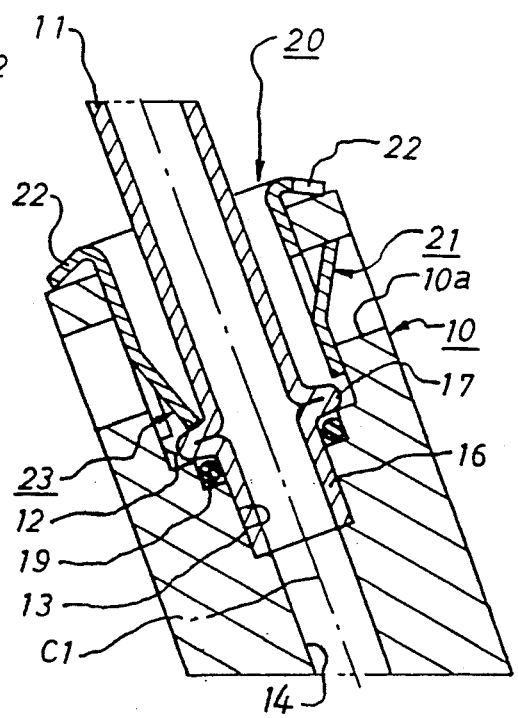
FIG. 2 is an enlarged vertical sectional partial view of FIG. 1.

FIG. 1 shows an embodiment wherein the present invention is applied to a piping of a clutch operating cylinder called generally as CSC (abbreviation of concentric slave cylinder), and a left side of FIG. 1 represents a front side. FIG. 2 is an enlarged view of A part of FIG. 1. As illustrated in FIG. 2, the pipe joint of this invention is equipped with a joint body 10 made of resin and a pipe 11 made of metal.

The joint body 10 has, in consecutive order from its end portion, an annular large opening port 12, a small opening port 13 connecting with the large opening port 12, and a small pipe coupling port 14 connecting with the small opening port 13 and having a smaller diameter than that of the small opening port 13. The small pipe coupling port 14 connects with an oil passage 15. A hole 10a (fitting) opening in the radial direction is made on a peripheral wall which partitions the large opening port 12, and the first claw 21 of a tubular fixture 20, which will be described later, rests in this hole 10a.

A part in the vicinity of a tip end portion 16 of the pipe 11 is compressed by a press work, for example, toward an axial line C1 so that an outward facing flange 17 extending outwardly in the radial direction is formed integrally. The pipe tip end portion 16 fits in the small opening port 13 and connects to the pipe coupling port 14, and a gap between the pipe tip end portion 16 and the small opening port 13 is sealed by an O-ring 19. The tubular fixture 20 is an integral forming part made of mild steel for example, and its inside diameter is made a little larger than that of the outward facing flange 17 of the pipe 11. One end of the tubular fixture 20 is provided with a stopping portion 22 which rests against an opened end edge of the joint body 10. The stopping portion 22 is composed of eight, for example, (only two are shown in FIG. 2) projecting members extending outwardly in the radial direction.

One piece, for example, of the above-mentioned first claw 21 is formed on a peripheral wall of the tubular fixture 20. The first claw 21 is cut and raised at the outer peripheral side in the axial direction. The first claw extends in such a position that it leaves the axis line C1 as it comes to a side opposite to the small opening port 13 of the joint body 10, and functions as a spring member which is shrinkable inwardly in the radial direction of the joint.

A second claw 23 is formed on the other end of the tubular fixture 20. The second claw 23 is cut and raised at the inner peripheral side in the axial direction. The second claw extends in such a position that it gets near to the axis line C1 as it comes to the small opening port 13 side, rests against a backside face of the outward facing flange 11, and functions as a spring member which is expandable outwardly in the radial direction of the joint. According to the above structure, the tubular fixture 20 is first fitted in the large opening port 12 in order to couple the pipe joint of this invention. The second claw 21 is thereby pushed in while reducing its diameter under a state where the claw is pressed onto an inner peripheral surface of the joint body, and opens at a position fronting on the hole 10a so as to rest in the hole 10a. At the same time, the stopping portion 22 rests against an open end edge of the joint body 10, so that it fastens the tubular fixture 20 to the joint body 10 in cooperation with the first claw 21. In the next stage, the pipe tip end portion 16 is fitted in the small opening port 13 of the joint body 10 through an inside of the tubular fixture 20. The O-ring 19 is to be previously fitted onto the pipe tip end portion 16, in this instance. The outward facing flange 17 is thereby pushed in while expanding the second claw 23 of the tubular fixture 20. The second claw 23 is returned to the radial inside again by its spring force to rest against the backside face of the outward facing flange 17, so that the pipe 11 is coupled to the joint body 10 through the tubular fixture 20 as illustrated by the figure.

In FIG. 1, 30 is a flywheel and 31 is a clutch disc which spline fits onto an output shaft 32 (input shaft of transmission). 33 is a pressure plate which presses a friction facing 34 located at an outer peripheral part of the clutch disc 31 onto the flywheel 30. 35 is a diaphragm spring, and its outer peripheral part 35a is always seated on a projection 33a of the pressure plate 33 to press the pressure plate 33 to the front side. 36 is a clutch cover, and its outer peripheral part is secured to the flywheel 30 and its inner peripheral part supports the diaphragm spring 35 through a pair of wire rings 37. 38 is a release bearing which is installed slidingly in a direction of axis line C2 of the output shaft 32 to press a backside of the diaphragm spring 35 when a clutch is disengaged. 39 is a housing. The joint body 10 of this invention is secured to an inner peripheral part of front face of the housing 39 and the oil passage 15 connects with an annular cylinder 40 in the housing 39. The cylinder 40 is formed concentrically with the axis line C2 and opens to an inner peripheral part of backside of the diaphragm spring 35. A rear end portion of a cylindrical piston 42 is slidingly fitted in the cylinder 40, and the piston 42 is slidden by working oil in the cylinder 40 in parallel with the axis line C2. A tip end of the piston 42 is connected to the release bearing 38. 43 is a clutch pedal and 44 is a master cylinder. Function will be described hereunder. When a driver 45 treads on the clutch pedal 43, working oil under pressurized condition is supplied from the master cylinder 44 through the pipe 11 to the oil passage 15 and the cylinder 40. The piston 42 is thereby moved forward to shift the release bearing 38 forward. Consequently, the release bearing 38 press a backside face of the diaphragm spring 35, so that the outer peripheral part 35a of the diaphragm spring 35 is moved backward with the wire rings 37 utilized as its fulcrum point. Accordingly, a pressing force by which the pressure plate 33 pushes the friction facing 34 to the flywheel 30 is weakened so that the clutch is disengaged.

Considerable vibration and load will be produced on a connecting portion between the joint body 10 and the pipe 11 during this operation. However there is no chance for the working oil to leak because the tubular fixture 20 is firmly secured to the joint body 10 by the first claw 21 and the stopping portion 22 of the tubular fixture 20, and the second claw 23 holds the outward facing flange 17. Further, even when the pipe joint is installed in such a narrow space, the pipe connection work can be carried out simply and easily by only inserting the tip end portion 16 of the pipe 11 into the small opening port 13.

As described above, the present invention makes use of the tubular fixture 20 having the first claw 21, the stopping portion 22 and the second claw 23; so that the pipe connection work can be carried out simply in a short time by only inserting the pipe tip end portion 16 of the pipe 11 into the one-end inner peripheral part of the joint body 10 through the tubular fixture 20. Accordingly, the mass production can be accomplished easily and the automation of assembly work will become possible by employing the present invention.

Furthermore, according to the present invention, the first claw 21 is formed into such the springy shape that it is cut and raised from the peripheral wall to the outer peripheral side in the axial direction and gets away from the axis line as it comes to the side opposite to the small opening port of the joint body; so that the tubular fixture 20 itself does not deviate in the radial direction during assembly, and there is no fear for fingers or jigs to be caught between the opening end edge of the joint body 10 and the stopping portion 22 of the tubular fixture 20.

Since the metal tubular fixture 20 is utilized, the pipe joint has a sufficient strength and can be reduced its weight.

I claim:

1. A pipe joint having a pipe which includes a tip end portion having an outward facing flange in the vicinity of said tip end portion, a joint body for coupling the pipe, said joint body having an end face and a side wall, and a tubular metal fixture which has a diameter of an inner peripheral part larger than that of said outward facing flange, said joint body concentrically including an annular large opening port through said end face into which said tubular fixture fits and a small opening port which is connected to the large opening port and in which said pipe tip end portion fits and a fitting hole in said side wall intersecting said large opening port; characterized in that said tubular fixture has a stopping part which extends radially outwardly from one end of said tubular fixture to rest against said end face of said joint body, a springy first claw which is cut and raised from a peripheral wall of said tubular fixture to an outer peripheral side of said peripheral wall in an axial direction of said tubular fixture so that said springy first claw springs toward an axis line of said tubular metal fixture as said springy first claw comes into contact with a side of said opening port of said joint body and springs away from an axis line of said tubular metal fixture into said fitting hole in said side wall of said joint body when said stopping part engages said end face, and a springy second claw which is cut and raised from said peripheral wall of said tubular fixture to an inner peripheral side of said peripheral wall in the axial direction of said tubular fixture so that said springy second claw engages said flange and springs away from said axis line of said tubular fixture as said pipe comes to said small opening port of said joint body and when said flange passes said second claw, said second claw rests against a backside face of said outward facing flange of said pipe.

* * * * *